June 16, 1959
W. A. TIKANEN
2,890,588
FLUID PRESSURE DETECTOR
Filed Sept. 8, 1954
2 Sheets-Sheet 1
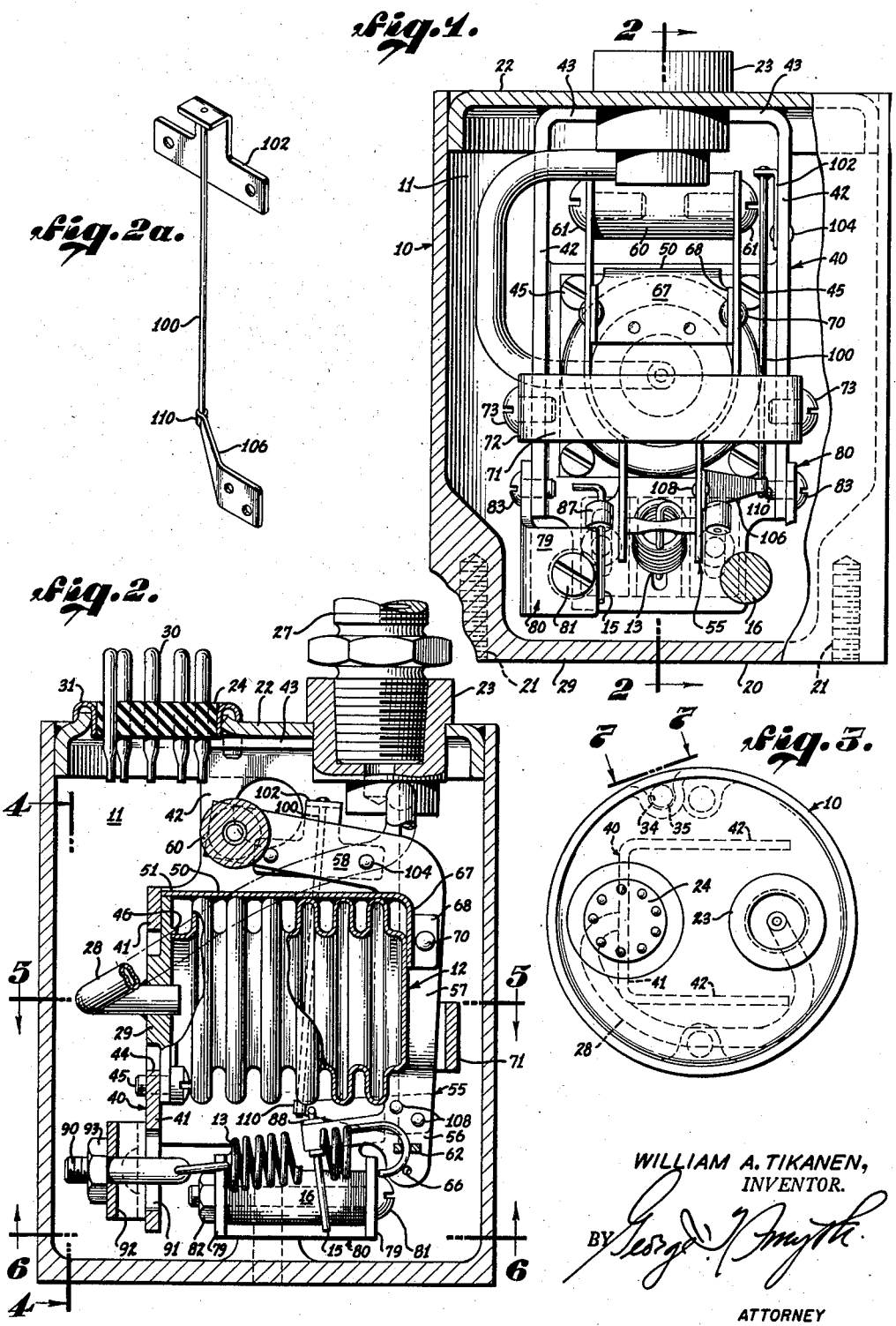
WILLIAM A. TIKANEN,
INVENTOR.
BY George V. Smyth
ATTORNEY

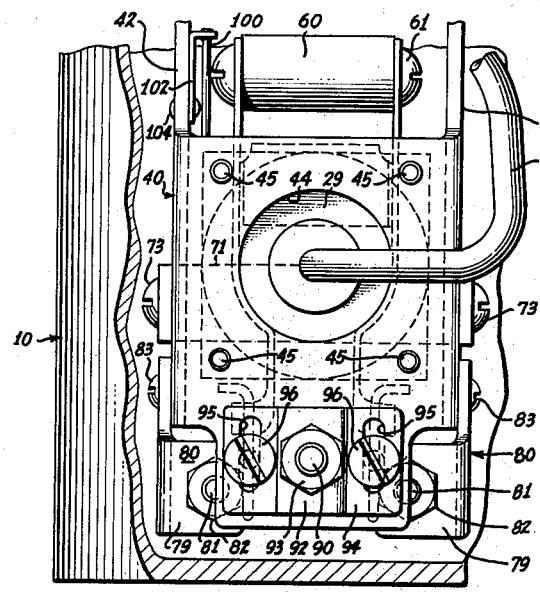

United States Patent Office 2,890,588
Patented June 16, 1959

2,890,588

FLUID PRESSURE DETECTOR

William A. Tikanen, Reseda, Calif., assignor to Genisco, Inc., Los Angeles, Calif., a corporation Application September 8, 1954, Serial No. 454,655

18 Claims. (Cl. 73—410)

This invention relates to devices for measuring fluid pressure, referring especially to devices incorporating fluid responsive bellows, and relates to the problem rendering such a device non-responsive to acceleration forces.

In a fluid pressure measuring device of this type, some kind of detecting means is operatively associated with the bellows to respond to the pressure changes. If such a device, constructed and arranged in a conventional manner, is installed where it will be subject to substantial acceleration forces, both the inertia of the bellows and the inertia of the detecting means associated with the bellows will introduce error into the pressure changes reported by the device. The errors tend to be of high magnitude in aircraft and guided missiles where high accelerations are normally to be expected. If a fluid pressure measuring device of this type is used as a sensing component of a servo system for automatic control of an aircraft or of a guided missile, it is, of course, of primary importance to avoid such erroneous actions.

The inertia of the material of a cylindrical corrugated bellows will cause the bellows to respond to acceleration and deceleration by lateral displacement, or by longitudinal extension and contraction, or by both movements, in accord with the direction of the force of acceleration of deceleration. The invention minimizes both such acceleration movements, in part, by fixedly anchoring one end of the bellows and, in part, by connecting one end of a laterally extending restricting member to the bellows, the other end of the restricting member being fixed to restrict the bellows against lateral movement, the restricting member being flexible to permit longitudinal extension and contraction of the bellows. Thus the restricting member permits longitudinal extension and contraction of the bellows in response to fluid pressure but restricts such responsive movement to a predetermined longitudinal path. In the preferred practice of the invention the restricting member is a resilient member such as a piece of spring wire and the range of longitudinal extension and contraction of the bellows is within the elastic limits of the resilient member. The advantage of such a combination is that the yielding resistance of the spring member to flexure has a stabilizing effect in reducing the responsiveness of the bellows to acceleration forces longitudinally of the bellows.

The preferred practice of the invention is further characterized by the concept of extending rigid means from the free end of the bellows to a region intermediate the two ends of the bellows and of connecting the stabilizing flexible member to this rigid means in this intermediate region.

The preferred practice of the invention also incorporates the provisions for reducing acceleration responsiveness that are set forth in my co-pending application, Ser. No. 376,636, filed on or about August 26, 1953, and entitled Fluid Pressure Measuring Device, which disclosure is hereby incorporated into the present disclosure by reference. Thus, as taught by my copending application, the preferred practice of the present invention includes a stiffening member that is attached to the side of the cylindrical bellows tangentially thereof to stiffen one longitudinal side of the bellows and to restrict longitudinal expansion and contraction of the bellows on that side. The arcuate movement of expansion and contraction of the cylindrical bellows occurs in a central diametrical plane perpendicular to the tangential stiffening means and the tangential stiffening means is sufficiently flexible to bow slightly in this central plane in response to expansion of the bellows. The stiffening means is relatively wide, however, and preferably is anchored rigidly at the anchored end of the bellows so that the stiffening means confines movement of the bellows to the central plane and makes the bellows non-responsive to components of force outside the central plane.

It has been found that restricting the expansion and contraction action of the bellows along one side in this manner not only reduces to a minimum lateral displacement or side sway on the part of the bellows, but also minimizes longitudinal reaction of the bellows to accelerations in or near the direction of the bellows axis. In the preferred practice of the invention, the further step of spring-loading the bellows further minimizes the acceleration responsiveness of the bellows.

Immunization of the associated responsive indicating means against acceleration effects is further accomplished, in part, by confining the responsive movement thereof to one plane or planes parallel to one plane and by balancing the responsive detecting means with respect to acceleration forces in that plane. In the preferred practice of the invention the detecting means includes a responsive member operatively connected to the outer end of the bellows to oscillate or move arcuately with the end of the bellows in the same central diametrical plane as the bellows. The arcuate path of the responsive member at least approximates a true arc having an axis of curvature substantially perpendicular to the diametrical plane.

Acceleration responses on the part of the responsive member are further minimized, in part, by balancing the mass of the responsive member with respect to anticipated acceleration forces in the aforementioned central diametrical plane. Preferably the center of gravity of the responsive member together with any structure movable therewith is at least approximately located at the axis of curvature of its arcuate path of movement for equilibrium of the responsive member under acceleration force exerted in any direction in the central diametrical plane.

For the purpose of disclosure, the invention will be described herein as embodied in a fluid pressure transducer which converts fluid pressure values into electrical values, but it will be understood that the invention is not limited to this particular purpose. Preferably, the detecting means includes a pivoted responsive member and a potentiometer cooperative therewith. The pivoted responsive member is operated by the bellows and carries the brush or wiper of the potentiometer. With the bellows and the responsive means, including the potentiometer brush, immune from acceleration forces, such an arrangement may be used in a servo system for reliable and accurate automatic control in the operation of aircraft and guided missiles.

The various features, advantages and possible applications of the invention may be readily understood from the following detailed description of the selected embodiment of the invention as a fluid pressure transducer, the description being considered with the accompanying drawings.

In the drawings, which are to be regarded as merely illustrative:

Figure 1 is a side elevation of the selected embodiment of the invention with parts broken away to reveal concealed structure;

Figure 2 is a sectional view taken in general as indicated by the line 2—2 of Figure 1;

Figure 2a is a perspective view of a flexible means that may be employed to restrict the responsive movement of the bellows to a predetermined longitudinal path;

Figure 3 is a top view of the device on a reduced scale;

Figure 4 is an enlarged section taken as indicated by the line 4—4 of Figure 2;

Figure 5 is a section taken as indicated by the line 5—5 of Figure 2;

Figure 6 is a section taken as indicated by the line 6—6 of Figure 2; and

Figure 7 is an enlarged detail viewed as indicated by the line 7—7 of Figure 3.

The principal parts of the form of the invention shown in the drawings include: a cylindrical housing, generally designated by numeral 10, which forms what may be termed an outer chamber 11; a bellows 12 inside the housing; a spring 13 tending to contract the bellows; and detecting means actuated by the bellows, which detecting means includes at least one brush or wiper 15 movable along a corresponding potentiometer 16. In the present embodiment of the invention there are two parallel potentiometers 16 and two corresponding wipers 15 actuated by the bellows.

If the device is to be employed to measure a differential fluid pressure, the housing 10 will be placed in communication with one of the two fluids involved and the interior of the bellows 12 will be placed in communication with the other of the two fluids. If the "gauge" pressure of a fluid is to be measured, the outer chamber 11 in the housing 10 will be placed in communication with the atmosphere and the interior of the bellows 12 will be placed in communication with the fluid under pressure. If the absolute pressure of a fluid is to be measured, the housing 10 will be evacuated to a high vacuum and the interior of the bellows 12 will be placed in communication with the fluid. For the purpose of the present disclosure, it will be assumed that the device is to be employed for measuring absolute pressure and therefore the housing 10 will be evacuated.

The housing 10 may be in the form of a cylindrical shell closed at one end by a bottom wall 20 and provided with threaded bores 21 to receive suitable screws for mounting the housing in upright position. The top of the housing may be closed in a sealed manner by a flanged wall member 22 in which is mounted an internally threaded body 23 and a suitable terminal header 24. The threaded body 23 is adapted to place the interior of the bellows 12 in communication with the fluid to which the device is to respond and for this purpose is adapted for engagement by a tubing connector 27 and is connected to a tube 28 inside the housing. The tube 28 is connected at its second end to the interior of the bellows 12 through a wall member 29 at the fixed end of the bellows.

The terminal header 24, in which is mounted a plurality of terminal members 30 for the electrical circuits involved, comprises a circular body of non-conducting material embraced by a ring 31. The purpose of the header 24 is to mount the terminal members 30 in the wall of the housing in a fluid-tight manner, the terminal members being connected by wires (not shown) to the two brushes 15 and the two potentiometers 16.

As shown in Figures 3 and 7, the cylindrical wall of the housing 10 may be offset to form a short longitudinal groove 34 on its exterior. A piece of tubing 35 is mounted in the groove 34 and at the end of the groove extends into the interior of the housing. Thus the tubing 35 lies entirely within the circumference of the housing. If the chamber 11 inside the housing 10 is to be placed in communication with a confined fluid body outside of the housing, the tubing 35 will be employed for communication with the fluid body; and if the device is to be used with the interior of the housing in communication with the atmosphere the tubing 35 will be open for this purpose. In the present embodiment of the invention, however, the purpose of the tubing 35 is to provide a convenient connection for evacuating air from the housing 10 to create a vacuum therein. When the housing has been evacuated, the piece of tubing 35 is pinched as shown and heat is applied to form a seal, the interior of the tubing being tinned or coated with solder for heat sealing.

The housing 10 may be employed as a base or fixed anchorage for the bellows 12, but preferably a special base member, designated as a whole by numeral 40, is fixedly mounted inside the housing to support the bellows. The particular base member 40 shown in the drawings is in the form of a U-shaped plate providing a base wall 41 and two side walls 42, the two side walls being formed with end flanges 43 by means of which the base member is welded or otherwise bonded to the end wall 22 of the housing 10. The base wall 41 of the base member is formed with a circular aperture 44 which is spanned by the previously mentioned end wall member 29 of the bellows, the wall member being fixedly mounted on the base wall by suitable screws 45. As best shown in Figure 5, the wall member 29 is formed with a circular flange 46 and the corrugated shell of the cylindrical bellows 12 is embraced by this flange with the shell bonded to the flange in a fluid-tight manner. The bellows 12 is formed with the usual circumferential folds or corrugations 47 for longtiudinal expansion and contraction in response to changes in the pressure differential between the interior and exterior of the bellows.

In accord with one of the concepts underlying the preferred practice of the invention, the bellows 12 is restricted against longitudinal expansion and contraction along one longitudinal side. For this purpose at least some of the corrugations 47 are suitably interconnected to prevent relative longitudinal movement therebetween at the points of interconnection. Preferably a suitable means is employed for the dual purpose of restricting longitudinal action on the selected side of the bellows and of stiffening the bellows against side sway with special effectiveness in one lateral direction.

In the present embodiment of the invention, what may be termed a first restricting means in the form of a plate or strap 50 is attached to one side of the bellows 12 for this purpose. The strap 50 is, in this instance, a substantially flat member attached tangentially to the side of the bellows and extending longitudinally of the bellows, the strap being connected tangentially to at least some of the corrugations 47 and preferably being connected to all of the corrugations. As shown in Figure 2, one end of the tangential strap 50 may be formed with a flange 51 that is bonded to the previously mentioned end wall member 29 of the bellows. Thus the strap is fixedly connected with the anchored end of the bellows and with the base member 40 on which the bellows is mounted.

As shown in Figure 1, the tangential strap 50 is preferably relatively wide to provide a high degree of resistance to lateral displacement or flexure of the bellows in the tangential plane of the strap and it is further contemplated that the tangential strap will materially oppose displacement or flexure of the bellows in the central diametrical plane of the bellows that is perpendicular to the tangential strap. Thus the strap substantially immobilizes the bellows against displacement or flexure in the tangential plane and minimizes flexure in the central diametrical plane of the bellows.

With one longitudinal side of the bellows 12 restrained against longitudinal movement by the restricting strap 50 and with the opposite longitudinal side of the bellows free to move longitudinally, the corrugations of the bellows will fan apart arcuately with rising fluid pressure in the bellows and the bellows will cause the restricting strap 50 to bow slightly at the same time.

Various arrangements for shifting the potentiometer wipers 15 or other equivalent means in response to the fanlike action of the bellows 12 may be employed in various practices of the invention. In this instance, a responsive member in the form of an angular brush carrier, designated as a whole by numeral 55, is suitably mounted on the assembly carried by the base member 40 to respond to extension and contraction of the bellows by arcuate movement in the previously mentioned central diametric plane of the bellows. Preferably the responsive member or brush carrier 55 is pivotally supported at relatively widely spaced points on a pivot axis to confine its movement to this central plane so that with respect to acceleration forces the problem of balancing the brush carrier for equilibrium is reduced to factors effective in this plane.

In the present construction, the responsive member or brush carrier 55 comprises two angular strap members 56 forming two diverging legs 57 and 58. The leg 57 lies against the end of the bellows for actuation thereby and overhangs the side of the bellows that is free to expand and contract with pressure changes. The other leg 58 of the brush carrier extends longitudinally adjacent the restricting strap 55. The two strap members 56 of the brush carrier are interconnected by a cylindrical counterweight 60 at one end, being attached thereto by suitable screws 61, and are interconnected at the other end by a strut 62.

As shown in Figure 6, the strut 62 is formed with reduced ends 65 by means of which the strut is mounted in corresponding bores 66 in the two straps. There is a plurality of pairs of the bores 66 to permit the strut to be shifted relative to the brush carrier for purpose of adjustment, as will be explained hereinafter.

The responsive member or brush carrier 55 is, in this instance, pivotally mounted on the restricting strap 50 in abutment with the end of the bellows. For this purpose, the restricting strap 50 is formed with an end portion 67 overhanging the end of the bellows and bonded thereto, this end portion being flanged to form two parallel ears 68. Suitable rivets 70, extending through the ears 68 and the corresponding strap members 56, mount the brush carrier 55 for the desired arcuate movement in response to pressure changes.

Since the spring 13 continually urges the responsive member or brush carrier 50 against the end of the bellows, it is not necessary to directly connect the brush carrier to the end of the bellows. It is to be understood, however, that the spring 13 may be omitted and the brush carrier bonded directly to the bellows.

Preferably suitable stop means is provided to prevent damaging extension of the bellows 12 in response to excessive pressure. For this purpose, a suitable bar 71 extends adjacent the free end of the bellows 12 to block excessive movement by the brush carrier 55. The two ends of the bar 71 are bent to form a pair of legs 72 as best shown in Figure 5 and these legs are attached by suitable screws 73 to the side walls 72 of the base member 40.

The two potentiometers 16 may be of a conventional construction in which a fine wire resistor is wound helically on a suitable cylindrical core. In the construction shown, each of the potentiometers 16 is mounted between the two ears 79 of a bracket 80 by means of an axial screw 81 and a nut 82. Each of the brackets 80 is mounted on a side wall 42 of the base member 40 by a pair of screws 83.

The two brushes 15 of the respective potentiometers 16 may be mounted on the responsive member or brush carrier 55 in any suitable manner. In the illustrated construction each of the two strap members 56 of the brush carrier 55 has an extension 87 which is looped around a non-conducting bushing 88 and the two brushes 15 are pin-like metal conductors mounted respectively in these two bushings. As may be seen in Figure 6, the two brushes 15 ride against the inner sides of the two potentiometers 16 and thereby cooperate with the two potentiometers to stabilize the brush carrier 55 and to prevent lateral movement of the brush carrier relative to the previously mentioned central diametrical plane.

The coil spring 13 that urges the brush carrier against the end of the bellows may be hooked at one end through a central aperture in the strut 62, as shown in Figures 2 and 6, and at the other end may be suitably attached or anchored to the base member 40. Preferably this anchored end of the spring is adjustable with respect to its attachment to the base member 40. For this purpose, the second end of the spring 13 is hooked through an eye in the end of adjustment screw 90 that extends through a longitudinal adjustment slot 91 in the base wall 41. The adjustment screw 90 extends in a longitudinally slidable manner through the wall of a U-shaped bracket 92 and is retained by a nut 93, the nut being pulled against the bracket by the tension of the spring 13. As best shown in Figure 4, the U-shaped bracket 92 is formed with two side flanges 94 having longitudinal slots 95. The U-shaped bracket 92 is mounted on the base wall 41 by a pair of screws 96 that extend through the two slots 95 respectively.

The special feature of the present invention is the stabilizing means shown in Figure 2a that comprises essentially a flexible member 100 that extends laterally of the bellows with one end attached to the bellows and the other end anchored. In the construction shown one end of the flexible member 100 is connected to a metal clip 102 that is anchored by rivets 104 to one of the side walls 42 of the U-shaped base plate 40. The other end of the flexible member 100 is connected with the bellows and preferably with the free end of the bellows. In the construction shown, a rigid arm member 106 is mounted by rivets 108 on the side of the brush carrier 55 and the end of the flexible member 100 is connected to the end of the arm member 106. Thus the arm member 106 extends rigidly from the free end of the bellows to a region intermediate the two ends of the bellows and the arm member 106 is connected to the flexible stabilizing member 100 in this intermediate region. Since the flexible member 100 acts, in effect, as a pivotal link means, it restricts the movement of the two brushes to a path that extends in a direction generally longitudinal of the bellows. Thus the flexible member 100 makes the bellows substantially non-responsive to components of acceleration force that are directed transversely of the bellows in the direction of the length of the flexible member.

Preferably the flexible member 100 is a resilient member in the form of a piece of spring wire that is anchored in a rigid manner at at least one end so that the spring wire seeks an unstressed position and yieldingly resists flexure away from that position. Thus when the flexible member 100 is stressed in flexure by longitudinal expansion and contraction of the bellows, it has a stabilizing effect in opposing components of acceleration forces on the bellows that are counter to its flexural stress. Either end or both ends of the spring wire may be held rigidly against flexure for this purpose. In the present embodiment of the invention both ends of the wire are rigidly held by corresponding connecting means, one end of the wire being soldered rigidly to the metal clip 102 and the other end being rigidly embraced by a sleeve 110 that is formed on the end of the rigid arm member 106.

In response to expansion and contraction of the bellows 12, each of the two brushes 15 moves in an arcuate path that is determined by the flexible stabilizing member 100. The approximate axis of curvature of the arcuate paths of the two brushes is in the central region of the restricting stiffening member or strap 50 approximately in the plane of the flexible member 100 when it is unstressed. The arcuate movement of the end of the bellows and the two brushes requires slight bowing on the part of the stiffening member 50.

It is apparent that the preferred practice of the invention embodies two cooperating restricting means. The first restricting means is the stiffening strap 50 which extends longitudinally of the bellows. The strap 50 is highly effective to stiffen the bellows in the plane of the strap, being, of course, yieldable in the direction perpendicular thereto. The second restricting means comprises the flexible stabilizing member 100 that extends transversely of the bellows.

As viewed in Figure 2, the counterweight 60 lies at a distance above this axis of curvature to balance the structure of the detecting means that lies below the axis of curvature. As a result, the structure of the detecting means including the brush carrier and the two brushes will be in equilibrium with respect to horizontal acceleration forces in the plane of Figure 2, which is the aforementioned central diametric plane of the bellows. It is further contemplated that the counterweight 60, as viewed in Figure 2, will lie to the left of the axis of curvature a sufficient distance to counterbalance the structure of the detecting means to the right of the axis of curvature so that the detecting means will be in equilibrium with respect to vertical acceleration forces in the central diametrical plane. Thus the center of gravity of the detecting means is substantially or approximately at the axis of curvature of the arcuate paths of the two brushes 15, so that the detecting means will be in equilibrium with respect to all possible components of acceleration force in the central diametrical plane.

The device may be adapted to respond in an optimum manner through different pressure ranges by using different springs 13 for the different ranges. Minor adjustment in the force exerted by any selected spring may be made by adjusting the points of connection at the opposite ends of the spring. Thus the strut 62 may be shifted upward as viewed in Figure 2 from one set of bores 66 to another set, and the adjustment screw 90 may at the same time be shifted downward as viewed in Figure 2, thereby lengthening the distance between the points of connection of the spring with corresponding increase in the length and tensioning of the spring. To shift the strut 62 from one pair of bores 66 to another, it is necessary merely to spring the two strap members 56 slightly apart temporarily. To shift the adjustment screw 90 in the adjustment slot 91, it is merely necessary to loosen the two screws 96 temporarily to permit the U-shaped bracket 92 to be shifted. In addition to these two adjustments the nut 93 may be rotated to lengthen or shorten the spring 13.

While the spring 13 may be omitted in view of the resiliency of the bellows, the spring is especially advantageous where linear responsiveness is desired. By using a spring that dominates the resiliency of the bellows linear responsiveness may be achieved with a relatively inexpensive bellows which in itself is non-linear.

My description in specific detail of the selected embodiment of the invention will suggest to those skilled in the art various changes, substitutions, and other departures from my disclosure that properly lie within the spirit and scope of the appended claims.

I claim:

1. In a device to measure fluid pressure in a system subject to acceleration forces, the combination of: a corrugated bellows to respond to changes in fluid pressure by longitudinal expansion and contraction; a first restricting means extending longitudinally of the bellows and interconnecting at least some of the corrugations of said bellows along one side of the bellows to restrict longitudinal expansion and contraction of the bellows along said side, with the bellows free for longitudinal expansion and contraction on its side diametrically opposite from said one side thereby to reduce the responsiveness of the bellows to acceleration forces longitudinally of the bellows; and a second flexible restricting means of fixed length extending in a direction laterally of the bellows and restraining said bellows against movement in said lateral direction to reduce the responsiveness of the bellows to acceleration forces in said lateral direction.

2. A device as set forth in claim 1 in which said first restricting means stiffens said bellows against movement in a first lateral direction in a plane 90° from the diameter defined by said two opposite sides of the bellows and said second restricting means restrains said bellows against movement in a second lateral direction substantially in the direction of said diameter.

3. A device as set forth in claim 1 in which said second restricting means is an elongated flexible member having one end anchored at a point spaced laterally from said bellows in the radial direction of said one side of the bellows and having its other end connected with said opposite side of the bellows for flexure with longitudinal expansion and contraction of said other side of the bellows.

4. A device as set forth in claim 3 which includes detecting means having a member responsive to expansion and contraction of said opposite side of bellows; and in which said second restricting means is connected to said responsive member.

5. A device as set forth in claim 4 in which said responsive member is at one end of said bellows and has means rigidly mounted thereon and extending therefrom to a region intermediate the two ends of the bellows, said second restricting means being connected to said rigidly mounted means in said region.

6. A device to measure fluid pressure, comprising: an assembly including a corrugated bellows anchored at one end to respond to changes in fluid pressure by longitudinal expansion and contraction at the other end; a first restricting means included in said assembly and extending along one side of said bellows longitudinally thereof, said restricting means being connected with said side of the bellows to restrict longitudinal expansion and contraction of the bellows along said side, the opposite side of the bellows being free to expand and contract; means mounted on the restricting means at the free end of the bellows for support by the restricting means and for pivotal movement in the direction of bellows expansion and contraction in response to the bellows expansion and contraction, said responsive means being dynamically balanced for equilibrium with respect to acceleration forces; and a second flexible restricting means extending generally laterally of said bellows, an end of said second restricting means being anchored against any movement with the bellows, the other end thereof being coupled to said responsive means to restrain the bellows and the responsive means against side sway in one lateral direction.

7. A device as set forth in claim 6 in which said first restricting means is a strap member of substantial width tangential of the bellows to restrain swaying of the bellows in the plane of the strap member; and in which said second restricting means extends substantially perpendicularly of said plane.

8. A device as set forth in claim 7 in which said flexible means lies in a plane that intersects the bellows laterally of the bellows between the two ends of the bellows.

9. In a device to measure fluid pressure in a system subject to acceleration forces, the combination of: a bellows having corrugations disposed in spaced relationship in a first direction and anchored at one end and free at the other end to respond to changes in fluid pressure by expansion and contraction in the first direction, restricting means extending along a first side of the bellows between the anchored and free ends of the bellows and coupled to the corrugations in the bellows to inhibit movement of the bellows along this side, a responsive member extending in a direction transverse to the first direction and coupled to the bellows against the free end of the bellows for pivotal movement in the first direction in response to the expansion or contraction of the free end of the bellows, and flexible means disposed in the transverse direction and fixedly anchored to the fluid-measuring device at one end and coupled at the other end to the responsive member to nullify components of force on the responsive member in the transverse direction.

10. In a device to measure fluid pressure in a system subject to acceleration forces, the combination of: a bellows having corrugations disposed in spaced relationship in a first direction and anchored at one end and free at the other end to respond to changes in fluid pressure by expansion or contraction in the first direction, a strap extending in the first direction between the anchored and free ends of the bellows at one side of the bellows and attached to the bellows to restrict the movement of the bellows along that side, a responsive member disposed in contiguous and coupled relationship to the free end of the bellows along that end and extending in a direction transverse to the first direction for pivotal movement in the first direction in accordance with the expansion or contraction of the bellows, an elongated flexible member disposed with the elongated dimension in the transverse direction and fixedly anchored at one end to the fluid-measuring device and coupled at the other end to the responsive member to reduce any sensing effect on the responsive member of forces exerted on the bellows and the responsive member in the transverse direction, and detecting means coupled to the responsive member to sense the movement of the responsive member in the first direction.

11. In a device to measure fluid pressure in a system subject to acceleration forces, the combination of: a bellows having corrugations disposed in spaced relationship in a first direction and anchored at one end and free at the other end for expansion or contraction in response to changes in fluid pressure, a strap coupled to a first side of the bellows between the anchored and free ends of the bellows to restrict the movement of the bellows along that side, responsive means coupled to the bellows along the free end of the bellows for pivotal movement in the first direction in accordance with the expansion or contraction of the bellows and extending in the first direction from the free end of the bellows to a region intermediate the ends of the bellows on a second side of the bellows, opposite to the first side, and flexible means having a fixed length and having one side fixedly anchored at the first side and extending to the second side of the bellows in a direction transverse to the first direction, and means for coupling the flexible means to the responsive means on the first side of the bellows to nullify components of acceleration force acting on the bellows in the transverse direction.

12. In a device to measure fluid pressure in a system subject to acceleration forces, the combination of: a bellows having one end fixedly disposed to receive fluid for measurement of the fluid pressure and having the other end disposed for expansion or contraction in accordance with changes in the fluid pressure, means for providing for the introduction of fluid into the bellows at the fixed end of the bellows, first restricting means attached to one side of the bellows and extending between the fixed and expansible ends of the bellows for preventing expansion or contraction of this side of the bellows, a responsive member disposed against the bellows at the expansible end of the bellows and coupled to the expansible end of the bellows for pivotal movement in accordance with the expansion or contraction of the bellows at the expansible end of the bellows and extending to the side of the bellows opposite from the restricted side, flexible means fixedly anchored at the restricted side of the bellows and coupled to the responsive member at the opposite side of the bellows to restrict the response of the bellows and the responsive member to forces acting in a direction between the restricted side of the bellows and the opposite side of the bellows, and detecting means including means fixedly anchored to the fluid-measuring device and means disposed in responsive relationship to the fixedly positioned means and carried by the responsive member for sensing the pivotal movements of the responsive member in the direction of expansion or contraction of the bellows.

13. The combination set forth in claim 12 in which the first restricting means is a strap attached to the bellows and in which the flexible means is a rod extending between the fixedly anchored position and the position of coupling to the responsive means.

14. The combination set forth in claim 12 in which the first restricting means is a rigid strap attached to the bellows along the restricted side of the bellows and having properties for preventing expansion or contraction of the strap in the plane of the strap and having properties of slight flexure in a direction substantially perpendicular to the plane of the strap and in which the flexible means is a rod having a fixed length and extending between the fixedly anchored position and the position of coupling to the responsive means for coupling to the responsive means at an intermediate distance between the ends of the bellows.

15. In combination, a bellows having one end fixedly disposed to receive fluid for measurement of the fluid pressure and having the other end disposed for expansion or contraction in accordance with changes in the fluid pressure, means for providing for the introduction of fluid into the bellows at the fixed end of the bellows, a strap having rigid properties in the plane of the plate and having properties of slight flexure in a direction perpendicular to its plane, the strap being attached to one side of the bellows between the fixed and expansible ends of the bellows to restrict expansion or contraction of the bellows at this side and being capable of slight flexure in a direction substantially perpendicular to the bellows expansion or contraction, a pivot pin attached to the strap at the expansible end of the bellows, a responsive member pivotally mounted on the pin and disposed in contiguous relationship to the bellows at the free end of the bellows for arcuate movement of the member relative to the strap in accordance with the expansion or contraction of the bellows, the responsive member extending along the free end of the bellows to a position at a free side of the bellows opposite to the restricted side of the bellows, means connected to the responsive member for returning the responsive member toward a position corresponding to zero fluid pressure upon a reduction in the pressure of the fluid in the bellows, detecting means including means fixedly anchored to the fluid-measuring means and means disposed in responsive relationship to the fixedly anchored means and carried by the responsive member for sensing at any instant the arcuate disposition of the responsive member, and a flexible rod fixedly anchored at the restricted side of the bellows and extending to the free side of the bellows for coupling to the responsive member at the free side of the bellows to restrict movements of the responsive member in a direction corresponding to the disposition of the flexible rod.

16. In combination, a bellows fixedly positioned at one end and movable at the other end and having an opening at the fixed end to receive fluid for the measurement of the fluid pressure in accordance with the expansion or contraction of the bellows at the movable end, means for providing for the introduction of fluid to the fixed end of the bellows, means extending across one side of the bellows between the fixed and movable ends of the bellows to restrict the expansion or contraction of the bellows at that side without affecting the expansion or contraction of the bellows along a free side opposite to the restricted side, a pivot pin mounted on the restricting means at the movable end of the bellows, a member mounted on the pin for pivotal movement relative to the restricting member and disposed against the movable end of the bellows for pivotal movement in accordance with the expansion or contraction of the bellows and extending along the free side of the bellows to a position intermediate the fixed and movable ends of the bellows, sensing means carried by the pivotal member for detecting the pivotal movements of the member, and means fixedly anchored at one end at the restricted side of the bellows and extending from the restricted side of the bellows to the free side of the bellows and coupled at the other end to the pivotal member at the movable end of the bellows to prevent movements of the bellows and the pivotal member in a direction extending between the free and restricted sides of the bellows.

17. The combination set forth in claim 16 in which the restricting means is a strap extending along the restricted side of the bellows and the flexible means is a rod extending from the restricted to the free side of the bellows for coupling to the pivotal member at the free side of the bellows.

18. The combination set forth in claim 17 in which a spring is fixedly anchored at one end and is connected to the pivotal member at the other end to exert a force on the pivotal member for returning the member toward a zero position upon the reduction in the fluid pressure in the bellows and in which a counter-balance is carried by the pivotal member at the end of the pivotal member opposite to the spring for acting with the spring in dynamically balancing the pivotal member in any position of the pivotal member.

References Cited in the file of this patent

UNITED STATES PATENTS

| | | |
|---|---|---|
| 45,247 | Jepson | Nov. 29, 1864 |
| 1,161,376 | Bristol | Nov. 23, 1915 |
| 1,848,053 | Bacon | Mar. 1, 1932 |
| 2,224,024 | Smith | Dec. 3, 1940 |
| 2,311,900 | Newell | Feb. 23, 1943 |
| 2,324,666 | Arigst | July 20, 1943 |
| 2,427,249 | Birch | Sept. 9, 1947 |
| 2,502,776 | Burdick | Apr. 4, 1950 |

FOREIGN PATENTS

| | | |
|---|---|---|
| 992,453 | France | July 11, 1951 |